United States Patent
Purushothaman et al.

(10) Patent No.: US 10,078,999 B2
(45) Date of Patent: Sep. 18, 2018

(54) DYNAMIC BANDWIDTH USAGE REDUCTION FOR DISPLAYS

(71) Applicant: Intel Corporation, Santa Clara, CA (US)

(72) Inventors: Vijay A. Purushothaman, Bangalore (IN); Mahesh Kumar, Bangalore (IN); Vandana Kannan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/194,008

(22) Filed: Jun. 27, 2016

(65) Prior Publication Data

US 2017/0278482 A1    Sep. 28, 2017

(30) Foreign Application Priority Data

Mar. 22, 2016  (IN) .............................. 201641010056

(51) Int. Cl.
*G09G 5/02* (2006.01)
*G06F 3/14* (2006.01)
*G09G 5/14* (2006.01)

(52) U.S. Cl.
CPC .............. *G09G 5/022* (2013.01); *G06F 3/14* (2013.01); *G09G 5/14* (2013.01); *G09G 2340/0428* (2013.01); *G09G 2340/10* (2013.01); *G09G 2350/00* (2013.01)

(58) Field of Classification Search
CPC .... H04N 5/2226; H04N 19/23; G06F 7/5336; G06F 2203/04804; G06T 15/503; G06T 2210/62

USPC ........................................................ 345/605
See application file for complete search history.

(56) References Cited

U.S. PATENT DOCUMENTS

| | | | |
|---|---|---|---|
| 9,324,170 B2* | 4/2016 | Hong ..................... | G06T 15/503 |
| 2003/0098881 A1* | 5/2003 | Nolte ..................... | G06F 3/0481 |
| | | | 715/764 |
| 2006/0059432 A1* | 3/2006 | Bells ..................... | G06F 3/0481 |
| | | | 715/768 |
| 2006/0101293 A1* | 5/2006 | Chandley ............... | G06F 1/3203 |
| | | | 713/300 |
| 2007/0056015 A1* | 3/2007 | Kortum ............... | H04N 21/6338 |
| | | | 725/134 |
| 2009/0204989 A1* | 8/2009 | White ............... | H04N 21/25808 |
| | | | 725/37 |
| 2011/0122224 A1* | 5/2011 | Lou ....................... | H04N 19/597 |
| | | | 348/42 |
| 2013/0038625 A1* | 2/2013 | Nakajima .............. | G06T 11/203 |
| | | | 345/611 |
| 2016/0098853 A1* | 4/2016 | Liang ..................... | G06T 5/002 |
| | | | 345/641 |

* cited by examiner

*Primary Examiner* — Sae Won Yoon
(74) *Attorney, Agent, or Firm* — Hanley, Flight & Zimmerman LLC

(57) ABSTRACT

Methods and apparatus for dynamically reducing bandwidth usage by embedded displays are disclosed. An example method includes receiving a request to display a frame associated with a pixel depth on a display of a computing device, determining whether the frame includes a background layer, and when the frame includes the background layer, adjusting the pixel depth of the background layer.

15 Claims, 8 Drawing Sheets

DYNAMIC BANDWIDTH USAGE REDUCTION FOR DISPLAYS

FIELD OF THE DISCLOSURE

This disclosure relates generally to displays and, more particularly, to methods and apparatus to dynamically reduce bandwidth usage by embedded displays.

BACKGROUND

Computing devices (e.g., computers, smartphones, tablets, televisions, etc.) include displays to output frames (e.g., images) to a user. A display often includes thousands to millions of pixels that output light in various colors to display a frame. In recent years, the number of pixels in a typical display has increased from less than 340,000 pixels to over 8.2 million pixels. The number of colors that a single pixel can output corresponds to a number of bits used to drive the pixel (e.g., the more bits per pixel, the more colors the pixel can output).

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
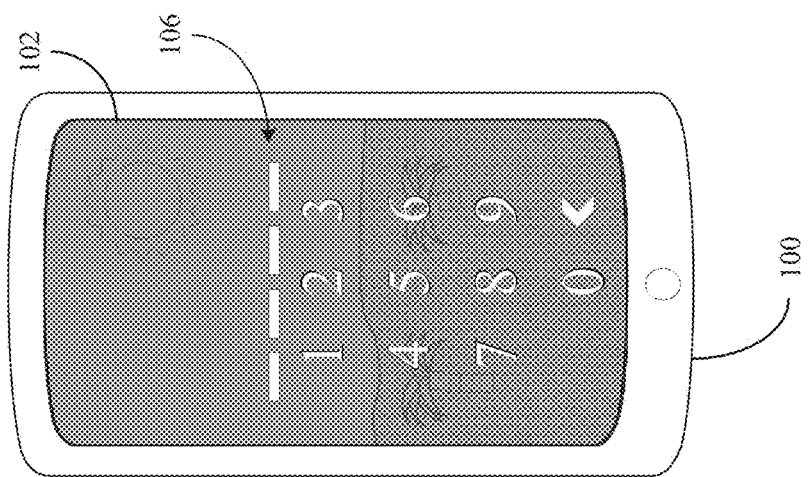
FIG. 1 is an illustration of an example computing device outputting different frames on a display.
Figure 1:
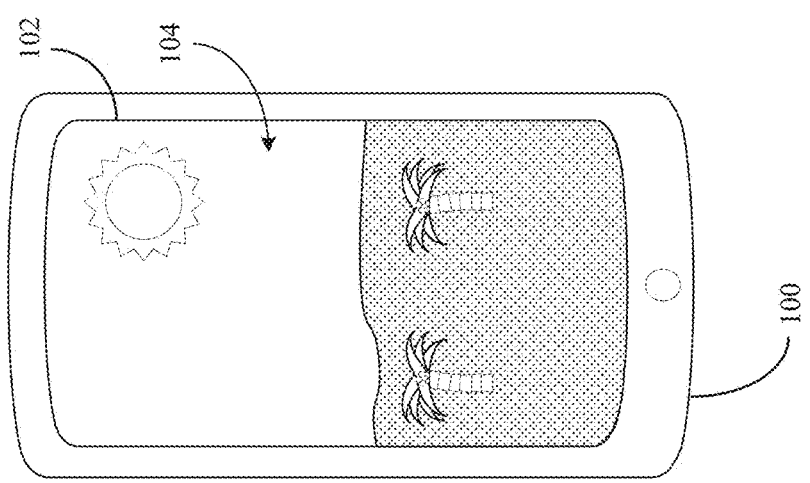

Computing devices may include a display to output images and/or frames of a video. Such displays are often embedded in that they are mounted in the housing of the device. Displays come in various dimensions and resolutions, but generally include a number of rows and columns of pixels to output static images and/or frames of a video. For example, a computing device may include a 1080p display including 1920 rows and 1080 columns of pixels (e.g., 2.07 million total pixels). In some examples, a computing device may include a 4K display including 4096 rows and 2160 columns of pixels (e.g., 8.29 total million pixels). Although the above dimensions are common examples of displays, a computing device may include any type of display with any number and/or configuration of pixels. As the number of pixels in a display increases, the power to drive and/or the memory and signaling resources necessary to control the display increase. For example, outputting a 4k resolution video refreshing at 60 frames per second with a pixel depth of 24 bits per pixel on a display requires over 16 gigabits per second bandwidth (e.g., (4096 pixels)(2160 pixels)(60 frames per second)(24 bits per pixel)=16.98 gigabits per second). However, outputting a 1080p resolution video at 60 frames per second with a pixel depth of 24 bits per pixel on the device requires less than 4 gigabits per second bandwidth (e.g., (1920 pixels)(1080 pixels)(60 frames per second)(24 bits per pixel)=3.98 gigabits per second).

A number of bits is used to control each pixel. The number of bits corresponds to a number of colors that can be output by the pixel (e.g., a pixel depth). For example, the number of colors that can be output by a pixel is $2^b$, where b is the number of bits. For example, one bit-per pixel correlates to two colors (e.g., $2^1=2$, black and white), two bit per pixel correlates to 4 colors (e.g., $2^2=4$), etc. In general, the higher the pixel depth, the better the image/frame will look when output by the display. Although most current displays utilize 24-32 bits per pixel, any number of bits per pixel may be utilized, including but not limited to 48 bits per pixel. As the pixel depth (i.e., the number of bits used to control one pixel) of a frame increases, the power consumption and/or bandwidth associated with transferring the frame from memory to the display increases. For example, outputting a 1080p resolution video at 60 frames per second with a pixel depth of 32 bits per pixel on a display requires about 4 gigabits per second bandwidth (e.g., (1920 pixels)(1080 pixels)(60 frames per second)(32 bits per pixel)=3.98 gigabits per second). However, outputting a 1080p resolution video at 60 frames per second with a pixel depth of 16 bits per pixel on the display requires about 2 gigabits per second bandwidth (e.g., (1920 pixels)(1080 pixels)(60 frames per second)(16 bits per pixel)=1.99 gigabits per second).

Examples disclosed herein significantly reduce the power consumption, bandwidth consumption, and bus usage necessary to transfer a frame from memory to the display by reducing the pixel depth of particular layers of a frame without significantly hindering the quality of the frame. Reducing the pixel depth reduces the size of the data associated with the frame. Thus, reducing pixel depth reduces the amount of power and/or processor resources required to transfer the frame data from memory to the display. In some examples, a frame output by a display may include two or more overlapping layers. The overlapping layers may include a background layer and a partially transparent foreground layer. Because the background layer is partially covered, the pixel depth for the background layer can be reduced without hindering the overall quality of the frame. The reduction of pixel depth for the background layer cannot be detected by the human eye and reduces the amount of data being transferred by the operating system which reduces power consumption, bandwidth consumption, and/or bus usage. In examples disclosed herein, a window manager of a computing device detects when a frame includes multiple layers and reduces the pixel depth of identified background layers. In some examples, the window manager reduces the pixel depth of all background layers to a pre-set pixel depth. In some examples, the window manager reduces the pixel depth based on the transparency and/or size of the foreground layer. For example, when a foreground layer is very transparent, the window manager may only slightly reduce the pixel depth of the background layer. When the foreground layer is not very transparent, the window manager may significantly reduce the pixel depth of the background layer.

Examples disclosed herein also significantly reduce the power consumption, bandwidth consumption, and/or bus usage necessary to output images and/or frames of a video from memory by reducing the resolution (which reduces the amount of transferred data) of a frame when, for example, the charge of a battery of the computing device satisfies (e.g., is below) a threshold percentage. To this end, an operating system of the computing device monitors charge of the battery, processor resources, and/or user preferences and triggers a change in the resolution of the frame to reduce the bandwidth usage associated with outputting a frame from memory to the display to conserve power and/or processor resources at the expense of a lower quality image. As further described below, when a condition is satisfied, the operating system ceases outputting frames at a high resolution and starts outputting the frames at a lower resolution. For example, the computing device may include a condition where, when the charge of the battery is below 20% of its full capacity, the resolution of frames output by the display is reduced from a 4K resolution to a 1080p resolution. In such an example, when the charge is above 20% of its full capacity, the operating system outputs frames at the 4K resolution. When the battery discharges to below 20% of its full capacity, the operating system detects that the condition is satisfied, stops outputting the frames at 4K resolution, and continues to output the frames at a 1080p resolution to reduce the bandwidth usage associated with the image data transfer by a factor of four.

FIG. 1 illustrates different frames output by an example computing device 100. The illustration includes the example computing device 100 has an example display 102. In the example of FIG. 1, the display 102 is shown displaying a first example frame 104 (left side of FIG. 1) and a second example frame 106 (right side of FIG. 1). An operating system of the computing device 100 instructs the example display 102 to output the first example frame 104 and/or the second example frame 106 based on, for example, execution of a program, application, etc.

The example computing device 100 of FIG. 1 is an electronic device including an operating system to output frames on the example display 102. The operating system of the example computing device 100 receives instructions and/or requests from applications executing on a processor or the device 100 to output the example frames 104, 106. In some examples, such as in FIG. 1, the computing device 100 is implemented as a smart phone. Alternatively, the example computing device may be a computer, a laptop, a tablet, a phablet, a mobile device, a television, a projector, a personal digital assistant, and/or any other type of computing device including and/or electrically coupled to a display.

The example display 102 of FIG. 1 includes a plurality of pixels. As further described in FIG. 2, each of the plurality of pixels is controlled by a display driver of the operating system. In some examples, the display 102 includes a large number of pixels (e.g., a 4k display). In some examples, the display 102 includes a smaller number of pixels (e.g., a 480i display). Each pixel is controlled by the operating system to output a particular color. As described above, the number of colors which may be displayed by a given pixel is based on the number of bits used by the operating system to control that pixel. The amount of power and/or bandwidth usage associated with the data transfer necessary to output the example frames 104, 106 depends on the number of pixels controlled to display the example frames 104, 106 and the pixel depth of each pixel (e.g., the amount of data that needs to be transferred). The number of pixels controlled to output the example frames 104, 106, and the pixel depth correlate to the quality of the frame (e.g., the higher number of pixels and/or deeper the pixel depth, the higher the quality of the image output by the example display 102)

Frames may have one or more layers. The first example frame 104 of FIG. 1 is a single layer frame such as a wallpaper of a computing device. The example computing device 100 may output the first example frame 104 on the example display 102 using the highest available resolution to output the highest quality image. As further described in conjunction with FIGS. 4 and 6, the example computing device 100 may decrease the resolution to reduce the bandwidth usage associated with transferring the image data to the display; thereby conserving power. The decrease in resolution may be based on settings associated with the computing device 100. For example, when the computing device 100 is in a low power mode (e.g., based on a threshold amount of of charge left in a battery of the computing device 100), the example computing device 100 may enter a low resolution mode to save power. Additionally or alternatively, a user may adjust the settings to operate the example computing device 100 in low resolution mode regardless of the amount of charge remaining in the battery (e.g., 0%-100%).

The second example frame 106 of FIG. 1 includes multiple layers. The first layer (i.e., the background layer) includes the same image as the first example frame 104 and the second layer (i.e., the foreground layer) is an image of a password lock screen frame. The second layer overlaid on the first layer, but is at least partially is transparent so that a user of the computing device 100 can still view the first layer (e.g., the wallpaper) in the background. To achieve this effect, data used to generate the second layer includes an alpha component. The alpha component is a code that causes the layer to be transparent. The amount of transparency of the second layer depends on a value associated with the alpha component. As further described in conjunction with FIGS. 3 and 5, an operating system of the computing device 100 may decrease the pixel depth (e.g., the bits per pixel) for the background layer when a foreground layer includes an alpha component (e.g., is transparent) without hindering overall frame quality or hindering the user experience. Decreasing the pixel depth reduces the amount of data being transferred to output an image on the display which conserves processor resources, reduces the amount of bits transferred to the display (e.g., reducing bandwidth consumption and/or bus transfer) and reduce power consumption.

Figure 2:
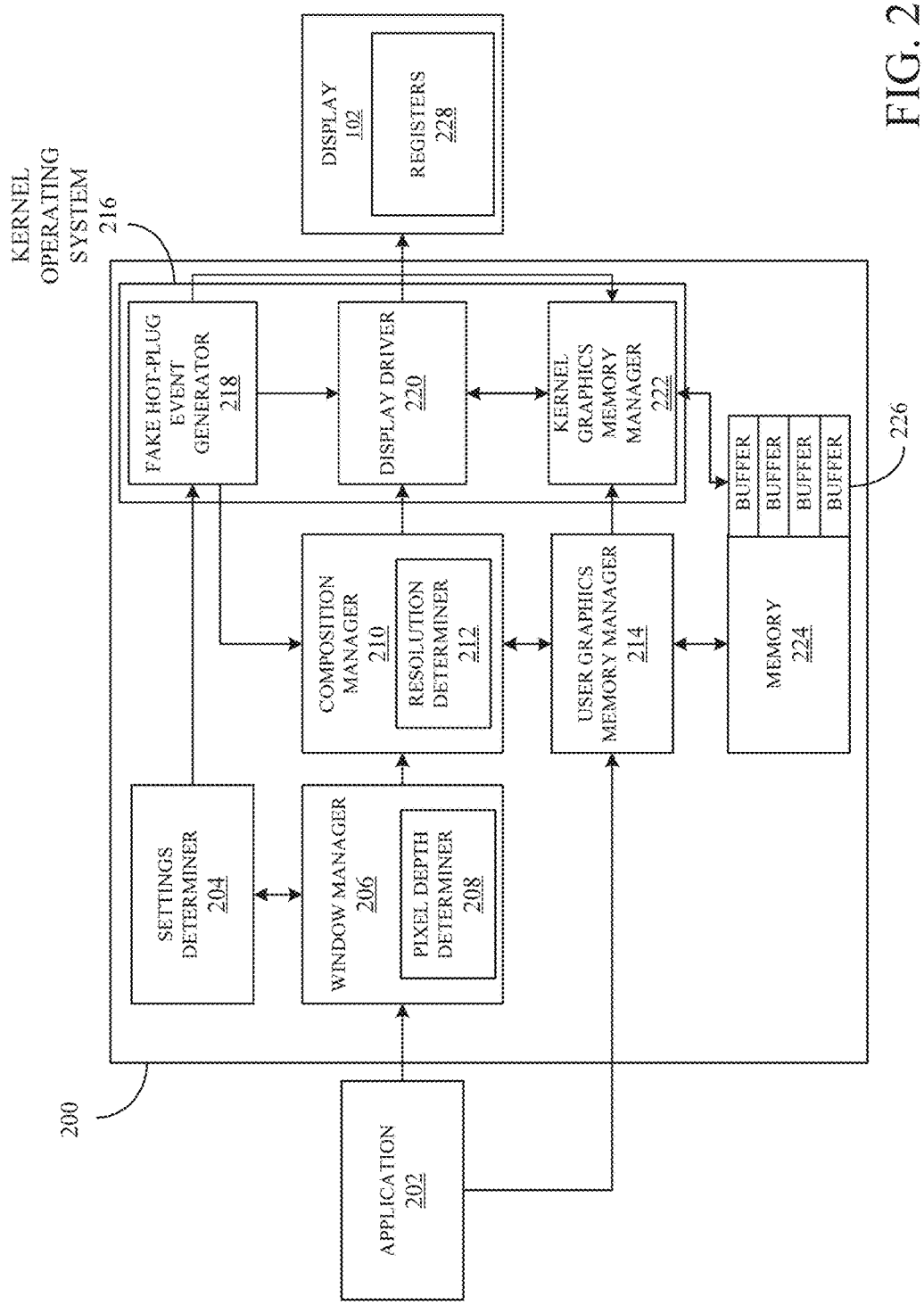
FIG. 2 is an illustration of an example operating system used to output a frame on the display of FIG. 1.

FIG. 2 is a block diagram of an example implementation for an operating system 200 of the example computing device 100 of FIG. 1. In the example of FIG. 1, an application 202 executes on the computing device 100. The operating system 200 of the example of FIG. 2 is structured to automatically adjust pixel depth and/or resolution of the frame. The example operating system 200 of FIG. 2 includes an example settings determiner 204, an example window manager 206, an example pixel depth determiner 208, an example composition manager 210, an example resolution determiner 212, an example user graphics memory manager 214, an example kernel operating system 216, an example fake hot-plug event generator 218, an example display driver 220, and an example kernel graphics memory manager 222.

The example operating system 200 of FIG. 2 is implemented by hardware, software, and/or firmware and functions to manage hardware and/or software resources of the example computing device 100 such as the application 202 and/or the example display 102. In some examples, the example operating system 200 may be Apple OS, Linux, Microsoft Windows, Google Chrome OS, Android, iOS, and/or any other type(s) of operating system.

The example application 202 of FIG. 2 is a program which performs functions, tasks, and/or activities. In some examples, the application 202 causes the operating system 200 to output an image and/or a sequence of frames (e.g., of a video) to the example display 102. For example, the application 202 may transmit a request to the example windows manager 206 of the operating system 200 to output one or more images. The application 202 transmits data associated with the image(s) (e.g., frame data) to the example user graphics memory manager 214 of the operating system 200. The frame data includes the data needed to display the image at multiple pixel depths and/or resolutions. The example application 202 may be a web browser, a word processor, a widget, a media player, a game, a social media application, and/or any other type(s) of application. As used herein, the term frame and image are used interchangeably.

The example settings determiner 204 of FIG. 2 monitors settings associated with the example computing device 100. The settings may include conditions defining when to adjust the pixel depth of frame(s) and/or adjust the resolution of the frame(s) prior to outputting the frame(s). The settings may be based on user and/or manufacturer preferences. For example, the computing device 100 may be initialized with a setting that adjusts (e.g., lowers) the frame resolution when the charge of a battery of the example computing device 100 is below 25% of its full capacity (e.g., is 75% spent). In some examples, the user may change the setting to lower the frame resolution when the charge is below any other threshold (e.g., 20% capacity). Additionally or alternatively, the user may change the setting to lower the frame resolution to a first resolution when the charge is below a first (e.g., 20%) capacity and lower the resolution to a second resolution (e.g., lower than the first resolution) when the charge is below a second (e.g., 10%) capacity. When such a setting is satisfied, the example settings determiner 204 transmits a signal to the example fake hot-plug event generator 218 to trigger an action as explained below. Additionally, a user may adjust the settings so that when a frame includes multiple layers (e.g., the example frame 106), the example display 102 outputs the background layer with a reduced pixel depth to reduce the amount of data transferred to output the frame(s) on the example display 102 to conserve power, to reduce the amount of data transferred, and/or to otherwise conserve processor resources.

The example window manager 206 of FIG. 2 controls the position on a frame on the example display 102 based on a request from the example application 202. The example window manager 206 of FIG. 2 includes the example pixel depth determiner 208. As further described in conjunction with FIGS. 3 and 5, the example pixel depth determiner 208 may adjust the pixel depth of a background layer based on settings identified by the example settings determiner 204. For example, the example pixel depth determiner 208 of the example windows manager 206 communicates with the example settings determiner 204 to determine if an adjust pixel depth setting is activated on the example computing device 100. If the adjust pixel depth setting is not activated, the example pixel depth determiner 208 selects a maximum pixel depth for the example frame. The maximum pixel depth may be included in the frame request or may be based on limitations of the example display 102. If the adjust pixel depth setting is activated, the example pixel depth determiner 208 processes the frame request to identify if there are multiple layers within the frame. In particular, the example pixel depth determiner 208 processes the request from the application 202 to identify the layers of a frame associated with the request and to determine if one or more of the layers includes an alpha component. If a layer includes an alpha component, the example pixel depth determiner 206 determines that the corresponding layer is transparent and identifies which layer(s) will appear behind the transparent layer(s) (e.g., which layer(s) are background layer(s)). The example pixel depth determiner 208 reduces the pixel depth of layers that do not include alpha components (e.g., background layers). Assuming the adjusted pixel depth setting is active, the example pixel depth determiner 208 transmits the pixel depth to the example composition manager 210.

The example composition manager 210 of FIG. 2 combines all of the layers of the frame(s) associated with the request frame the application 202 based on the pixel depth chosen by the example pixel depth determiner 208. The example composition manager 210 of FIG. 2 includes the example resolution determiner 212. The example resolution determiner 212 determines a resolution for displaying the example frame based on a fake hot-plug event (if any) received from the example fake hot-plug event generator 218. As further described below, the fake hot-plug event is a trigger based on the settings determined by the example settings determiner 204. When the example composition manager 210 receives a fake hot-plug event, the example resolution determiner 212 reduces the resolution of the frame to be displayed. In particular, the example resolution determiner 212 transmits a buffer data request to the example user graphics memory manager 214. The buffer data request requests the frame data corresponding to the pixel depth determined by the example pixel depth determiner 208 and the determined resolution from the user graphics memory manager 214. The example resolution determiner 212 receives a buffer data response from the example user graphics memory manager 214. The buffer data response may include data identifying one of the buffers of a set of buffers 226 of the memory 224. The identifier buffer contains the version of the image having the desired resolution and pixel depth (e.g., a in the 1080i resolution frame with a 24 bit per pixel depth). In response to a buffer response message from the user graphics memory manager 214, the example resolution determiner 212 transmits the buffer data (or an address of the buffer containing the buffer data) to the example display driver 220 of the example kernel operating system 216.

The example user graphics memory manager 214 of FIG. 2 receives and stores frame data associated with each layer of each frame into the example memory 224. In some examples, the user graphics memory manager receives the source image(s) from the application in a first format. The source image(s) exhibit the highest resolution and deepest pixel depths for these particular image(s). The source image (s) are stored in the memory 224. In some examples, the user graphics memory manager 214 parses the image into its respective layers and stores each respective layer in a corresponding buffer in a set of buffers 226 in the memory 224. In some examples, the user graphics memory manager 214 generates multiple versions of the source image(s). The various versions of the source image(s) generally have at least one of a lower resolution or a shallower pixel depth.

These versions may be stored in the memory 224. In some examples, the different versions are parsed into layers by the user graphics memory manager 214 and stored in different ones of the buffer(s) 226.

When the example user graphics memory manager 214 receives a buffer request, the example user graphics memory manager 214 presents a buffer response for the verification of the layers of the images(s) having the pixel depth value and/or resolution associated with the buffer data request. In some examples, the example user graphics memory manager 214 stores frame data associated with different pixel depth(s) and/or resolutions in the different ones of example buffers 226. In some examples, after the example pixel depth determiner 208 adjusts the pixel depth and/or the example resolution determiner 212 adjusts the example resolution, the example user graphics memory manager 214 clears the example buffers 226 and stores frame data associated with the newly adjusted pixel depth and/or the new resolution in the example buffers 226.

The example kernel operating system 216 of FIG. 2 is responsible for the creation and destruction of memory space(s) in the memory 224 of the example computing device 100 to allow software to be properly executed. The example kernel operation system 216 of this example includes the example fake hot-plug event generator 218, the example display driver 220, and the example kernel graphics memory manager 222.

The example fake hot-plug event generator 218 of FIG. 2 generates a signal (e.g., a trigger or flag) when the example settings determiner 204 determines that a particular condition associated with the settings of the example computing device 100 is satisfied. For example, the computing device 100 may include a setting that adjusts the screen resolution when the charge of the battery is below 20% of its full capacity. In such an example, the fake hot-plug event generator 218 will receive a signal from the example settings determiner 204 identifying that the condition is satisfied. In response to receiving the signal, the fake hot-plug event generator 218 generates a fake hot-plug event. A fake hot-plug event is a signal to indicate that the currently displayed resolution needs to be adjusted. In some examples, the example fake hot-plug event generator 218 may transmit the fake hot plug event to the example display driver 220 and/or to the kernel graphics memory manager 222 to clear the frame data stored in the example buffers 226 (i.e., to clear the frame data) associated with the previous resolution about to be replaced by the new resolution). In such examples, the frame data stored in the example buffers 226 is cleared so that new frame data associated with the new adjusted resolution can be used. In the illustrated example, the example fake hot-plug event generator 218 also transmits the fake hot plug event to the example composition manager 210 to indicate that the frame data in the example buffers 226 has been cleared and to cause the example composition manger 210 to reduce the resolution of the frame(s). In some examples, the fake hot-plug event generator 218 transmits a signal when the condition is no longer satisfied to cause the example composition manager 210 to cause the example composition manager 210 to raise the resolution of the frame(s). In some examples, this increase is to the maximum available resolution. In others, the processes of rising and lower the resolution is done incrementally to reach a higher (or lower) resolution until the maximum (or minimum) resolution is reached.

The example display driver 220 of FIG. 2 programs the relevant registers 228 of the display hardware associated with the example display 102 to present the frame on the example display 102. The example display driver 220 receives buffer data from the example composition manager 210 to identify frame data associated with the determined pixel depth and resolution stored in the example buffers 226. The buffer data can be, for example, address(es) of one or more of the buffers 226 from which to retrieve data. The example display driver 220 of FIG. 2 causes the example kernel graphics memory manager 222 to retrieve the appropriate frame data from the example buffers 226. The frame data is the image data to be displayed in the frame. Once the frame data is received, the example display driver 220 instructs the example display 102 to display the frame as specified by the frame data. In some examples, such as when the resolution has been reduced, the instructions from the example display driver 220 may include instructions to scale (e.g., up-scale) the lower resolution frame to fit the dimensions of the example display 102. For example, the example display 102 may include scaling hardware to receive frame associated with 720i resolution and up-scale the frame to fit 4k dimensions of the example display 102. In the illustrated example, the display driver 220 retrieves frame data from the example kernel graphics memory manager 222 every N seconds. For example, the display driver 220 may retrieve frame data associated with a new frame every 0.0167 seconds and instruct the example display 102 to output each frame (e.g., at a rate of 60 frames per second). Each transfer of frame data requires processor and power consumption; however, frame data associated with lower pixel depth and/or resolution is smaller in size (e.g., number of bits) then frame data with higher pixel depth and/or higher resolution. Thus, outputting a lower pixel depth and/or lower resolution data frame (e.g., frames associated with less data) requires less power and/or processor resources then the same frame at higher pixel depth and/or higher resolution.

In the example of FIG. 2, frame data stored in the example buffers 226 is associated with a resolution and pixel depth currently utilized by the example display 102. When the resolution and/or pixel depth of frames output by the example display 102 changes, the example kernel graphics memory manager 222 clears the buffers 226 and causes the example user graphics memory manager 214 to store new frame data corresponding to the new resolution and/or pixel depth the new resolution and/or pixel depth in the buffers 226. Alternatively, the example user graphics memory manager 214 may perform the clearing and repopulating of the buffers 226 when the pixel depth and/or the resolution changes.

Figure 3:
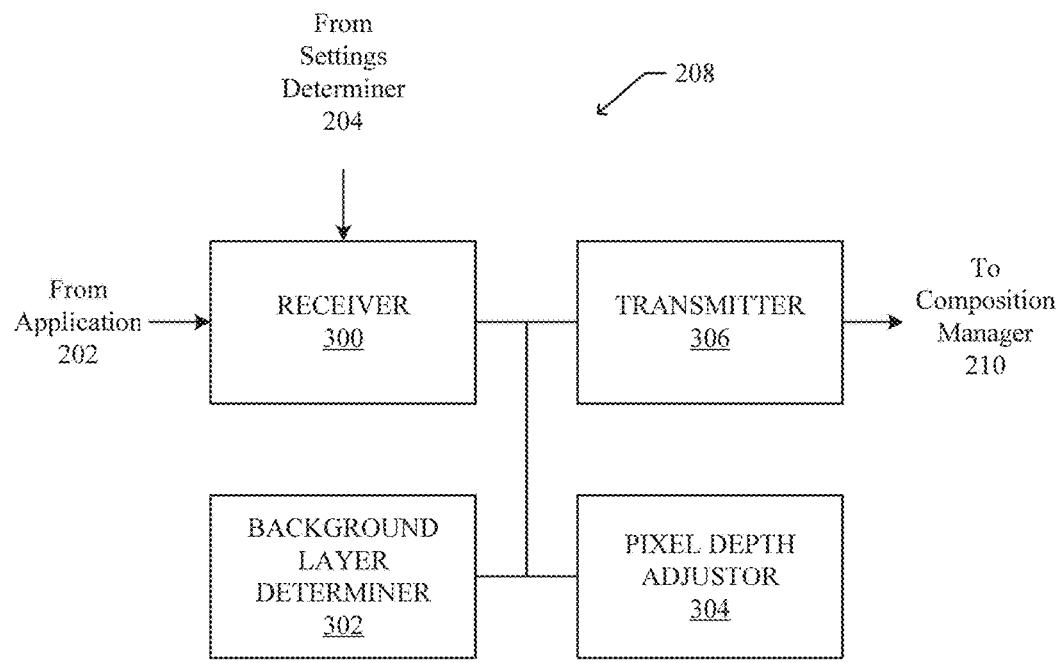
FIG. 3 is a block diagram of an example implementation of the pixel depth determiner of FIG. 2.

FIG. 3 is a block diagram of an example implementation of the example pixel depth determiner 208 of FIG. 2. In the example of FIG. 3, the example pixel depth determiner 208 identifies background layers of a frame and adjusts a pixel depth for the background layers. While the example pixel depth determiner 208 is described in conjunction with the example operating system 200 and the example display 102 of FIG. 2, the example pixel depth determiner 208 may be utilized to identify background layers of a frame and adjust pixel depth for the background layers for any type of operating system and/or display. The example pixel depth determiner 208 includes an example receiver 300, an example background layer determiner 302, an example pixel depth adjuster 304, and an example transmitter 306.

The example receiver 300 of FIG. 3 receives requests from the example application 202 of FIG. 2. As described above, the requests are associated with displaying a frame on the example display 102. In some examples, a frame may include only a single layer, such as the first example frame 104 of FIG. 1. In some examples, a frame may include multiple layers such as the second example frame 106 of FIG. 1. Additionally, the example receiver 300 receives data from the example settings determiner 204. As described above, the data corresponds to settings related to when and/or how to adjust the pixel depth of a frame.

The example background layer determiner 302 of FIG. 3 processes a request received by the example receiver 300 to identify whether the frame associated with the request includes two or more layers. If the frame includes two or more layers, the example background layer determiner 302 determines which layers are background layers. The example background layer determiner 302 may identify background layers based on the alpha components of the layers. For example, if a frame has two layers, a first layer with an alpha component and a second layer without an alpha component, the example background layer determiner 302 determines that the first layer is a transparent foreground image and the second layer is a background image.

The example pixel depth adjuster 304 of FIG. 3 selects a pixel depth for each layer of a frame based on the data from the example settings determiner 204. For example, the settings associated with the example computing device 100 may indicate a need to adjust pixel depth for background images. In some an examples, the example pixel depth adjuster 304 selects a lower pixel depth for background layers. In some examples, the pixel depth adjuster 304 may select a bit per pixel value based on the settings. For example, the settings of the computing device 100 may correspond to a particular pixel depth (e.g., 12 bits per pixel) for all background layers. In some examples, the pixel depth adjuster 304 may select a bit per pixel value based on the alpha component of the foreground layer and/or based on the size of the foreground layer. For example, the example pixel depth adjuster 304 may select a higher pixel depth when the foreground layer is more transparent (e.g., the background layer is more visible) and a lower pixel depth when the foreground layer is less transparent (e.g., the background layer is less visible). In such an example, the pixel depth adjuster 304 may select a pixel depth for a background layer based on the alpha component of an overlapping layer because the alpha component correlates to the transparency of the layer.

The example transmitter 306 of FIG. 3 transmits the frame request to the example composition manager 210. Additionally, the example transmitter 306 includes a pixel depth for each layer of the frame to the example composition manager 210. In some examples, the transmitter 306 transmits a request to identify if a pixel depth adjusting is activated or deactivated to the example settings determiner 204.

Figure 4:
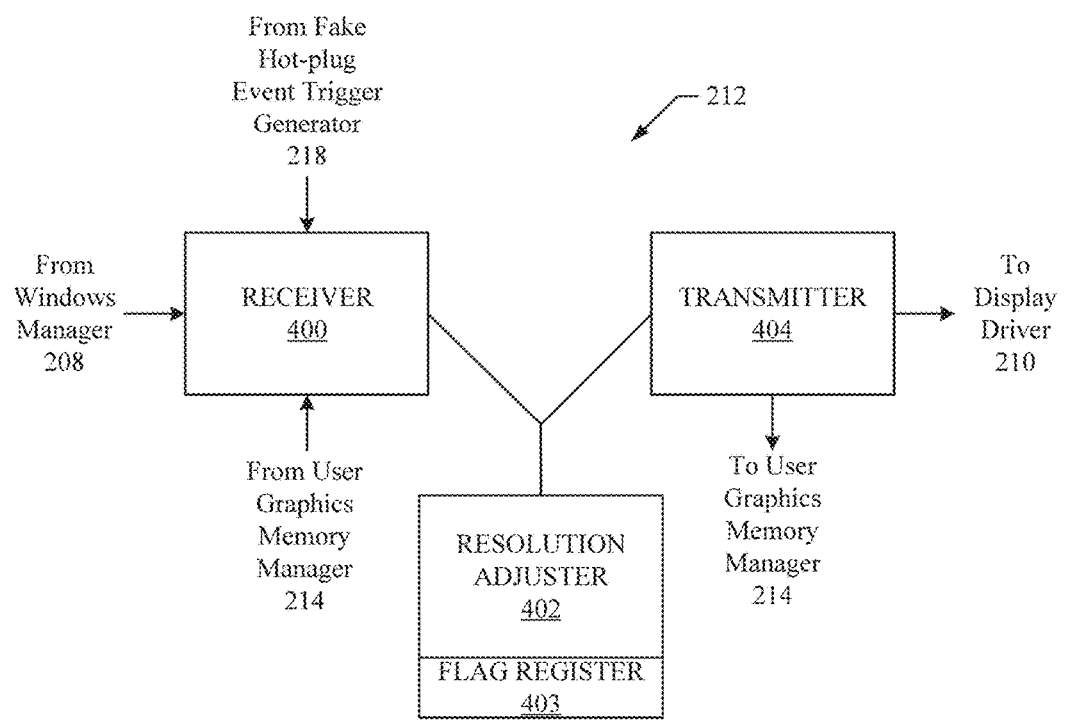
FIG. 4 is a block diagram of an example implementation of the resolution determiner of FIG. 2.

FIG. 4 is a block diagram of an example implementation of the example resolution determiner 212 of FIG. 2. In the example of FIG. 4, the example resolution determiner 232 adjusts frame resolution for a frame based on settings of the example computing device 100. While the example resolution determiner 208 is described in conjunction with the example operating system 200 and display 102 of FIG. 2, the example resolution determiner 208 may be utilized to adjust frame resolutions using any type of operating system and/or display. The example resolution determiner 208 of FIG. 4 includes an example receiver 400, an example resolution adjuster 402, an example flag register 403, and an example transmitter 404.

The example receiver 400 of FIG. 4 receives a frame request and a pixel depth for each layer of the frame associated with the frame request from the example windows manager 206. Additionally, the example receiver 400 receives buffer data responses from the example user graphics memory manager 214 of FIG. 2. In some examples, the example receiver 400 may receive a fake hot-plug event from the example fake hot-plug event generator 218 of FIG. 2. As described above, a fake hot-plug event indicates that a condition associated with adjusting the resolution of a frame is satisfied. In some examples, the receiver 300 may receive a second signal from the fake hot-plug event generator 218 when the condition is no longer satisfied.

The example resolution adjuster 402 of FIG. 4 adjusts the resolution of the frame associated with the frame request when a hot-plug event is received by the example receiver 400. In the illustrated example, the example resolution adjuster 402 sets a flag in the example flag register 403 when a fake hot-plug event is received. Additionally, the example fake hot-plug event generator 218 of FIG. 4 resets the flag when the example receiver 400 receives a signal signifying that the condition is no longer satisfied. The example resolution adjuster 402 of FIG. 4 may only adjust the resolution of a frame while the flag is set. The example resolution adjuster 402 adjusts the resolution based on settings of the example computing device 100 which may be controlled by a user of the computing device 100. For example, the settings may indicate that, when the charge in the battery is below a threshold (e.g., 20%) of its full capacity, the example resolution adjuster 402 should adjust the frame resolution to a first resolution (e.g., a 1080 resolution), lower than the current frame resolution (e.g., a 4K resolution). Additionally, the settings may indicate that the example resolution adjuster 402 should further adjust the frame resolution to a second resolution (e.g., a 720i resolution) when the charge in the battery is below a second lower threshold (e.g., 10% of its full capacity).

The example transmitter 404 of FIG. 4 transmits buffer requests for buffer data associated with the frame to the example user graphic memory manager 214 based on the selected pixel depth and resolution. Additionally, the example transmitter 404 transmits the data related to a received buffer data response to the example display driver 220 of FIG. 2. In some examples, the transmitter 404 transmits received hot-plug events to the example display driver 220 and/or the example user graphics memory manager 214 to clear the frame data stored in the example buffers 226 of FIG. 2 and transmits new frame data associated with the new resolution in the example buffers 226.

While example manners of implementing the example pixel depth determiner 208 and the example resolution determiner 212 of FIG. 2 is illustrated in FIGS. 3 and 4, elements, processes and/or devices illustrated in FIGS. 3 and 4 may be combined, divided, re-arranged, omitted, eliminated and/or implemented in any other way. Further, the example receiver 300, the example background layer determiner 302, the pixel depth adjuster 304, the example transmitter 306 and/or, more generally, the example pixel depth determiner 208 of FIG. 3, and/or the example receiver 400, the example resolution adjuster 402, the example transmitter 404, and/or more generally, the example resolution determiner 212 of FIG. 4 may be implemented by hardware, machine readable instructions, software, firmware and/or any combination of hardware, machine readable instructions, software and/or firmware. Thus, for example, any of the example receiver 300, the example background layer determiner 302, the pixel depth adjuster 304, the example transmitter 306 and/or, more generally, the example pixel depth determiner 208 of FIG. 3, and/or the example receiver 400, the example resolution adjuster 402, the example transmitter 404, and/or more generally, the example resolution determiner 212 of FIG. 4, could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example receiver 300, the example background layer determiner 302, the pixel depth adjuster 304, the example transmitter 306 and/or, more generally, the example pixel depth determiner 208 of FIG. 3, and/or the example receiver 400, the example resolution adjuster 402, the example transmitter 404, and/or more generally, the example resolution determiner 212 of FIG. 4, is/are hereby expressly defined to include a tangible computer readable storage device or storage disk such as a memory, a digital versatile disk (DVD), a compact disk (CD), a Blu-ray disk, etc. storing the software and/or firmware. Further still, the example pixel depth determiner 208 of FIG. 3 and/or the example resolution determiner 212 of FIG. 4 includes elements, processes and/or devices in addition to, or instead of, those illustrated in FIGS. 5 and 6, and/or may include more than one of any or all of the illustrated elements, processes and devices.

Figure 5:
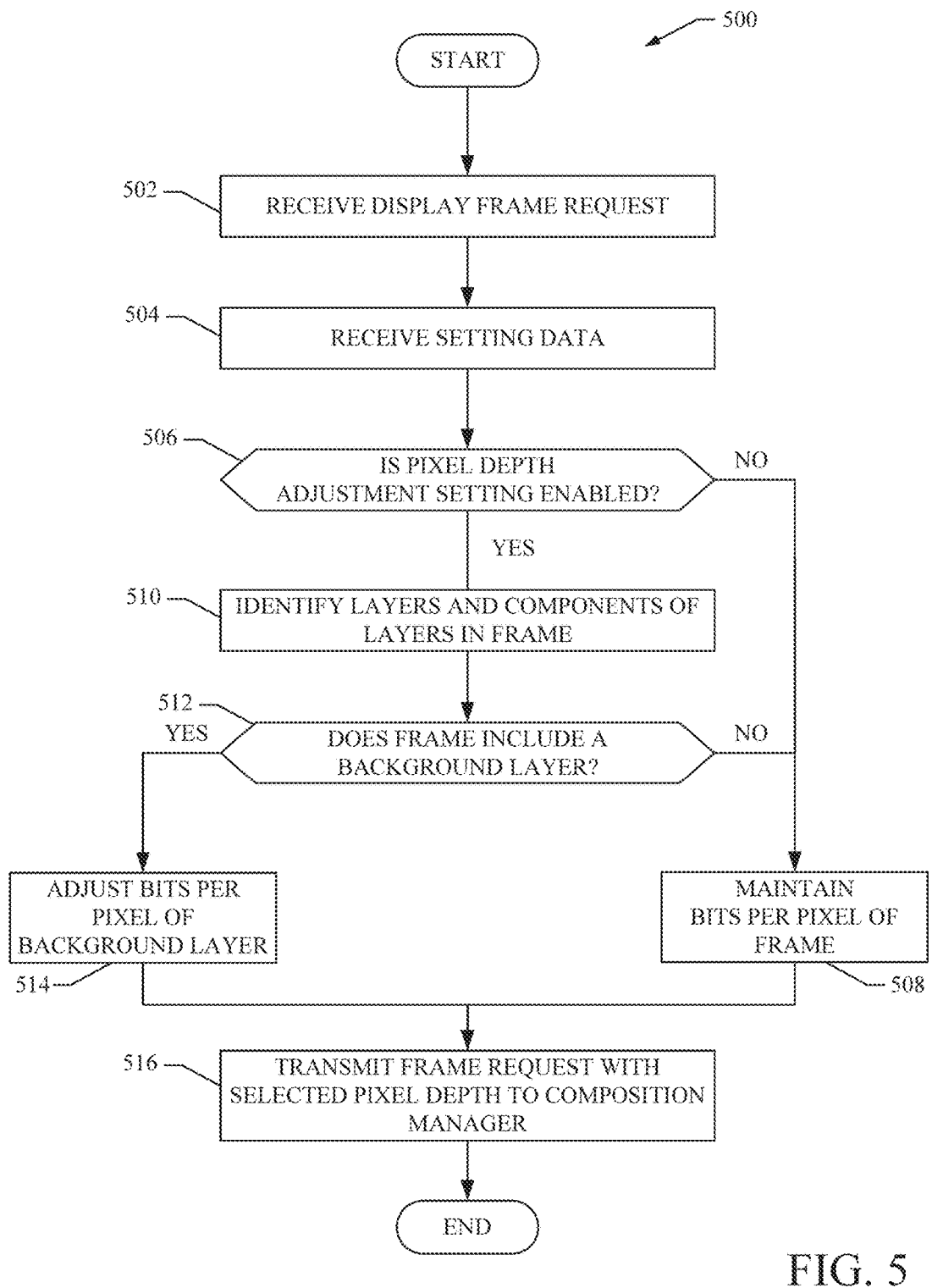
FIG. 5 is a flowchart representative of example machine readable instructions that may be executed to implement the example pixel depth determiner of FIG. 3 to determine a pixel depth for a frame.
Figure 6:
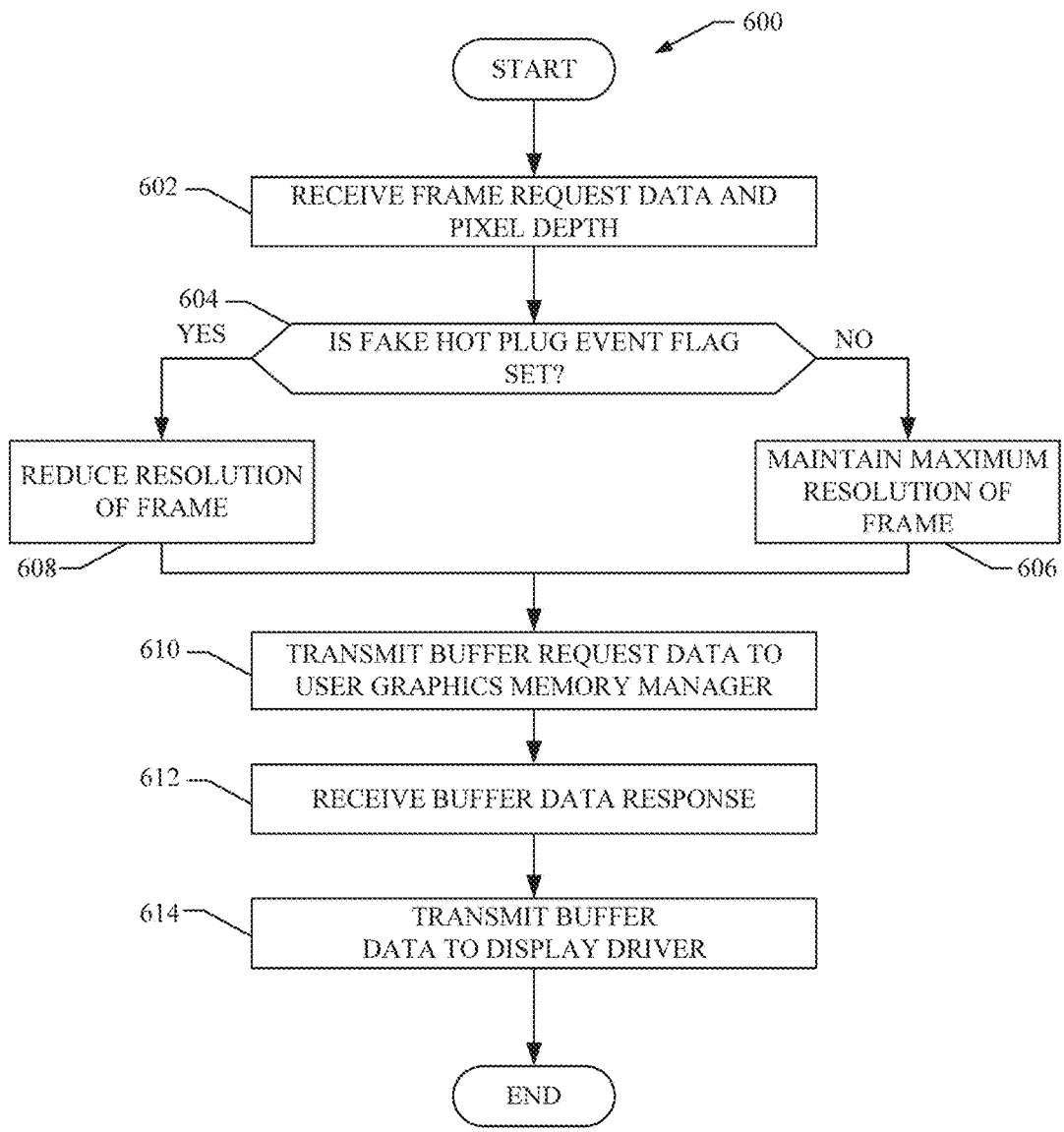
FIG. 6 is a flowchart representative of example machine readable instructions that may be executed to implement the example resolution determiner of FIG. 4 to determine a resolution of a frame.

A flowchart representative of example machine readable instructions for implementing the example pixel depth determiner 208 of FIG. 3 is shown in FIG. 5. A flowchart representative of example machine readable instructions for implementing the example resolution determiner 212 of FIG. 4 is shown in FIG. 6. In the examples, the machine readable instructions comprise program(s) for execution by one or more processor(s) such as the processors 712, 812 shown in the example processor platforms 700, 800 discussed below in connection with FIGS. 7 and 8. The program may be embodied in machine readable instructions stored on a tangible computer readable storage medium such as a CD-ROM, a floppy disk, a hard drive, a digital versatile disk (DVD), a Blu-ray disk, or a memory associated with the processors 712, 812, but the entire program and/or parts thereof could alternatively be executed by a device other than the processors 712, 812 and/or embodied in firmware or dedicated hardware. Further, although the example program is described with reference to the flowcharts illustrated in FIGS. 5 and 6, many other methods of implementing the example pixel depth determiner 208 of FIG. 3 and/or the example resolution determiner 212 of FIG. 4 may alternatively be used. For example, the order of execution of the blocks may be changed, and/or some of the blocks described may be changed, eliminated, or combined.

As mentioned above, the example processes of FIGS. 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flowchart 500 representative of example machine readable instructions that may be executed by the example pixel depth determiner 208 of FIG. 3 to adjust a pixel depth associated with a frame of a frame request.

At block 502, the example receiver 300 receives a request to display a frame. As described above, the frame request may include data related to displaying a frame on the example display 102 including a pixel depth and resolution. At block 504, the example receiver 300 receives settings data from the example settings determiner 204. In some examples, the example settings determiner 204 may transmit the settings data when the settings have been modified. In some examples, the example settings determiner 204 may transmit the settings data in response to a request from the example pixel depth determiner 208.

At block 506, the example pixel depth adjuster 304 determines if a pixel depth adjustment setting is enabled based on the settings data. If the the pixel depth adjustment setting is not enabled, the example pixel depth adjuster 304 maintains the bits per pixel value for each layer of the frame (block 508). The bits per pixel value (e.g., pixel depth) may be included with the frame request and/or may be based on the settings of the computing device 100. If the pixel depth adjustment setting is enabled, the example background layer determiner 302 identifies the layers and components (e.g., alpha components) in the frame (block 510). For example, the example background layer determiner 302 identifies how many layers are within a frame and if any of the frames include an alpha component. If a layer includes an alpha component (e.g. associated with transparency), then the example background layer determiner 302 determines that the frame includes a foreground later (e.g., based on the alpha component) and a background later (e.g., without an alpha component.

At block 512, the example background layer determiner 302 determines if the frame includes a background layer. As described above, a frame may include multiple overlapping layers. If a layer includes an alpha component, the layer is a transparent foreground layer and any layer without an alpha component is a background layer.

If the example background layer determiner 302 determines that the frame does not include a background layer, the example pixel depth adjuster 304 maintains the bits per pixel value of the frame (block 508). If the example background layer determiner 302 determines that the frame does include a background layer, the example pixel depth adjuster 304 reduces the bits per pixel of the background layer of the frame (block 514). For example, the pixel depth adjuster 304 may adjust the pixel depth of the background layer from, for example, 32 bits per pixel to, for example, 16 bits per pixel. Any other value may alternatively be used. As described above, the example pixel depth adjuster 304 may adjust the pixel depth based on settings of the computing device 100 and/or the value associated with alpha component (e.g., the amount of transparency) of the foreground layer. At block 516, the example transmitter 306 transmits the frame request with the selected pixel depth for each layer of the frame to the example composition manager 210.

FIG. 6 is a flowchart 600 representative of example machine readable instructions that may be executed by the example resolution determiner 212 of FIG. 4 to adjust the resolution of a frame output by the example display 102 of FIG. 2.

At block 602, the example receiver 400 receives the frame request and pixel depth data from the example window manager 206. At block 604, the resolution adjuster 402 determines if a fake hot-plug event flag is set. As described above, a fake hot-plug event flag is set when the example receiver 400 receives a fake hot plate event signifying that a condition for adjusting the resolution of a frame is satisfied. In some examples, the flag is reset when the example receiver 400 receives a signal signifying that the condition is no longer satisfied.

If the example resolution adjuster 402 determines that the fake hot-plug event flag is not set, the example resolution adjuster 402 maintains the current resolution of the frame (block 606). The current resolution may be based on a resolution associated with the frame request and/or a resolution associated with the example display 102. If the example resolution adjuster 402 determines that the fake hot-plug event flag is set, the example resolution adjuster 402 reduces the resolution of the frame (block 608). For example, the resolution adjuster 402 may reduce a frame from a 4k resolution to a 1080p resolution. Any other resolution may be used. As described above, when the resolution is reduced, a hardware scaler of the example display 102 may scale up the lower resolution frame to fit the dimensions of the example display 102.

At block 610, the example transmitter 404 transmits a buffer data request to the example user graphic memory manager 214. The buffer data request requests the example user graphics memory manager 214 to respond with buffer data associated with the frame based on the selected pixel depth and/or resolution. At block 612, the example receiver 400 receives the buffer data response. In response to receiving the buffer data response, the example transmitter transmits the buffer data to the example display driver 220 (block 614). As described above, the example display driver 220 retrieves corresponding frame data from the example kernel graphics memory manager 222 based on the received buffer data and instructs the example display 102 to output the example frame based on the frame data.

Figure 7:
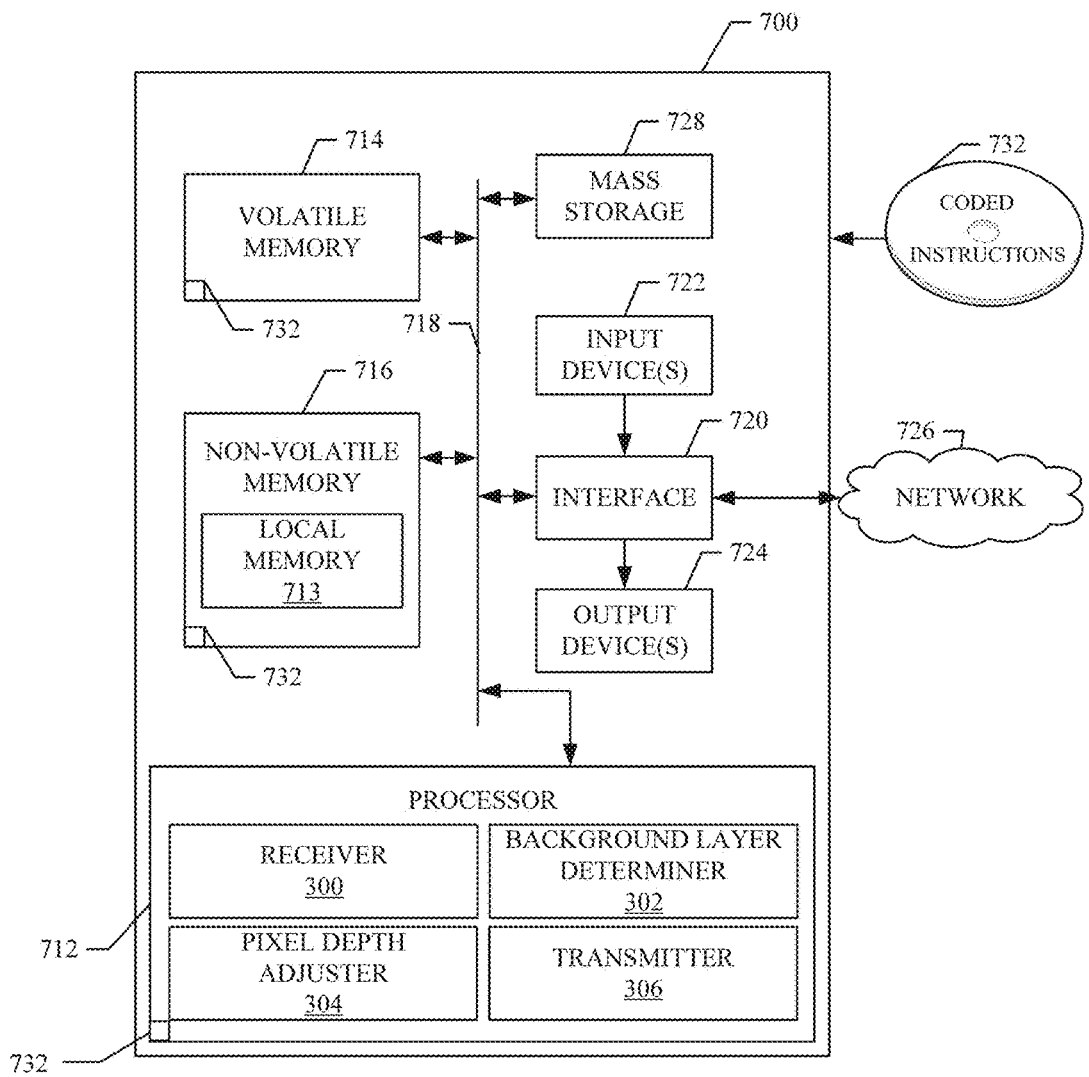
FIG. 7 is a block diagram of a processor platform structured to execute the example machine readable instructions of FIG. 5 to implement the example pixel depth determiner of FIG. 3.

FIG. 7 is a block diagram of an example processor platform 700 structured to executing the instructions of FIG. 5 to implement the example pixel depth determiner 208 of FIGS. 2 and 3. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by integrated circuits, logic circuits, microprocessors or controllers from any desired family or manufacturer.

The processor 712 of the illustrated example includes a local memory 713 (e.g., a cache). The example processor 712 of FIG. 7 executes the instructions of FIG. 5 to implement the example receiver 300, the background layer determiner 302, the example pixel depth adjuster 304, and/or the example transmitter 306 of FIG. 3 to implement the example pixel depth determiner 208. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a clock controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 7 may be stored in the mass storage device 728, in the volatile memory 714, in the non-volatile memory 716, and/or on a removable tangible computer readable storage medium such as a CD or DVD.

Figure 8:
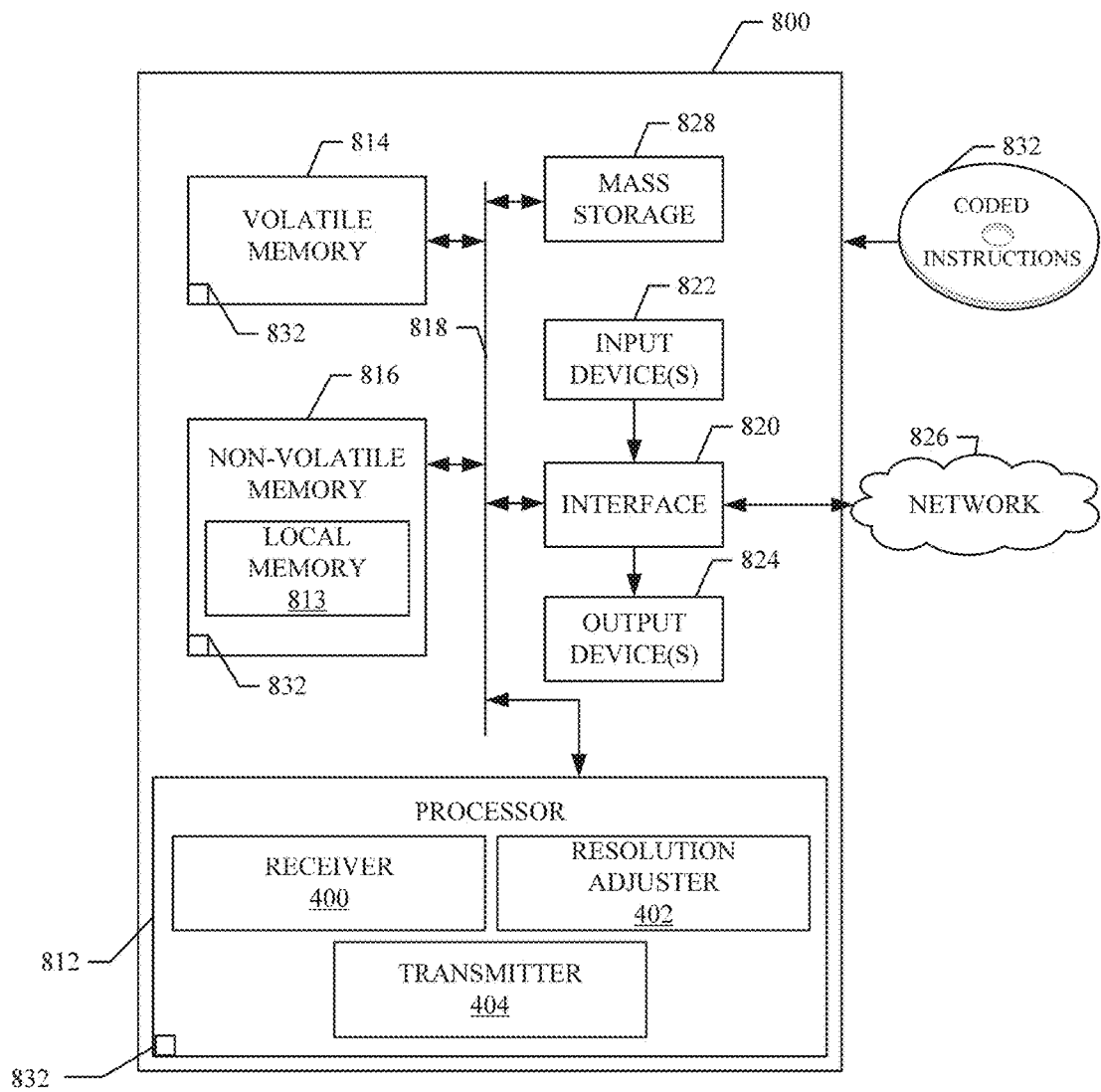
FIG. 8 is a block diagram of a processor platform structured to execute the example machine readable instructions of FIG. 6 to implement the example resolution determiner of FIG. 4.

FIG. 8 is a block diagram of an example processor platform 800 structured to executing the instructions of FIG. 6 to implement the example resolution determiner 212 of FIGS. 2 and 4. The processor platform 800 can be, for example, a server, a personal computer, a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by integrated circuits, logic circuits, microprocessors or controllers from any desired family or manufacturer.

The processor 812 of the illustrated example includes a local memory 813 (e.g., a cache). The example processor 812 of FIG. 8 executes the instructions of FIG. 6 to implement the example receiver 400, the example resolution adjuster 402, and/or the example transmitter 404 of FIG. 4 to implement the example resolution determiner 212. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a clock controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 8 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus, and articles of manufacture have been disclosed which adjust the pixel depth and/or resolution of a frame to be displayed on a display of a computing device to reduce the amount of data necessary to transfer a frame from memory to a display. As described herein, reducing the amount of data transferred conserves power and/or processor resources. In examples disclosed herein, a windows manager of an operating system in a computing device identifies when a frame includes multiple layers and dynamically adjusts the pixel depth of a background layer. Because the background layer is less visible, a reduction of pixel depth of the background image cannot be detected by the human eye. Thus, examples disclosed herein significantly reduce power and/or memory resources without hindering user experience. In examples disclosed herein, a composition manager of the operating system in the computing device identifies when a frame's resolution should be reduced to decrease the amount of data transferred to conserve power and/or processor resources. For example, when a computing device has a low battery charge, the composition manager may reduce the resolution of a frame output by a display of the computing device to conserve power and/or processor resources.

Example 1 is a method comprising receiving a request to display a frame associated with a pixel depth on a display of a computing device, determining whether the frame includes a background layer, and when the frame includes the background layer, adjusting the pixel depth of the background layer.

Example 2 includes the subject matter of example 1, wherein the frame is an image.

Example 3 includes the subject matter of example 1, wherein the frame is a video frame.

Example 4 includes the subject matter of examples 1, 2, or 3, further including identifying a first layer of the frame and identifying a second layer of the frame.

Example 5 includes the subject matter of example 4, wherein the first layer of the frame is a background layer when the second layer includes an alpha component.

Example 6 includes the subject matter of example 5, wherein the alpha component is associated with a transparency level.

Example 7 includes the subject matter of example 6, wherein the determining of whether the frame includes a background layer includes identifying the alpha component of the second layer.

Example 8 includes the subject matter of example 1, further including displaying the frame.

Example 9 includes the subject matter of example 8, wherein adjusting the pixel depth includes lowering the pixel depth of the background layer associated with displaying the frame.

Example 10 includes the subject matter of example 9, further including maintaining the pixel depth of a second layer of the frame, the second layer including an alpha component.

Example 11 includes the subject matter of examples 1, 8, or 9, wherein the pixel depth is a number of bits per pixel of a layer in the frame.

Example 12 is an apparatus comprising a receiver to receive a request to display a frame associated with a pixel depth on a display of a computing device. Example 12 further includes a background layer determiner to determine whether the frame includes a background layer. Example 12 further includes a pixel depth adjuster to, when the frame includes the background layer, adjust the pixel depth of the background layer.

Example 13 includes the subject matter of example 12, wherein the frame is an image.

Example 14 includes the subject matter of example 12, wherein the frame is a video frame.

Example 15 includes the subject matter of examples 12, 13 or 14, wherein the background layer determiner is to identify a first layer of the frame and identifying a second layer of the frame.

Example 16 includes the subject matter of example 15, wherein the first layer of the frame is a background layer when the second layer includes an alpha component.

Example 17 includes the subject matter of example 16, wherein the alpha component is associated with a transparency level.

Example 18 includes the subject matter of example 17, wherein the background layer determiner is to determine of whether the frame includes a background layer by identifying the alpha component of the second layer.

Example 19 includes the subject matter of example 12, further including a display to display the frame.

Example 20 includes the subject matter of example 19, wherein the pixel depth adjuster is to adjust the pixel depth by lowering the pixel depth of the background layer associated with displaying the frame.

Example 21 includes the subject matter of example 20, wherein the pixel depth adjuster is to maintain the pixel depth of a second layer of the frame, the second layer including an alpha component.

Example 22 includes the subject matter of examples 12, 20, or 21, wherein the pixel depth is a number of bits per pixel of a layer in the frame.

Example 23 is a computer readable medium comprising instructions that, when executed, cause a machine to receive a request to display a frame associated with a pixel depth on a display of a computing device, determine whether the frame includes a background layer; and, when the frame includes the background later, adjust the pixel depth of the background layer.

Example 24 includes the subject matter of example 23, wherein the frame is an image.

Example 25 includes the subject matter of example 23, wherein the frame is a video frame.

Example 26 includes the subject matter of examples 23, 24, or 25, wherein the instructions, when executed, cause the machine to identify a first layer of the frame and identifying a second layer of the frame.

Example 27 includes the subject matter of example 26, wherein the first layer of the frame is a background layer when the second layer includes an alpha component.

Example 28 includes the subject matter of example 27, wherein the alpha component is associated with a transparency level.

Example 29 includes the subject matter of example 28, wherein the instructions, when executed, cause the machine to determine of whether the frame includes a background layer by identifying the alpha component of the second layer.

Example 30 includes the subject matter of example 23, wherein the instructions, when executed, cause the machine to display the frame.

Example 31 includes the subject matter of example 30, wherein the instructions, when executed, cause the machine to adjust the pixel depth by lowering the pixel depth of the background layer associated with displaying the frame.

Example 32 includes the subject matter of example 31, wherein the instructions, when executed, cause the machine to maintain the pixel depth of a second layer of the frame, the second layer including an alpha component.

Example 33 includes the subject matter of examples 23, 31, or 32, wherein the pixel depth is a number of bits per pixel of a layer in the frame.

Example 34 is an apparatus comprising a first means to receive a request to display a frame associated with a pixel depth on a display of a computing device. Example 34 further includes a second means to determine whether the frame includes a background layer. Example 34 further includes a third means to, when the frame includes the background later, adjust the pixel depth of the background layer.

Example 35 includes the subject matter of example 34, wherein the frame is an image.

Example 36 includes the subject matter of example 34, wherein the frame is a video frame.

Example 37 includes the subject matter of examples 34, 35, or 36, wherein the second means is to identify a first layer of the frame and identifying a second layer of the frame.

Example 38 includes the subject matter of example 37, wherein the first layer of the frame is a background layer when the second layer includes an alpha component.

Example 39 includes the subject matter of example 38, wherein the alpha component is associated with a transparency level.

Example 40 includes the subject matter of example 39, wherein the second means is to determine of whether the frame includes a background layer by identifying the alpha component of the second layer.

Example 41 includes the subject matter of example 34, further including a fourth means to display the frame.

Example 42 includes the subject matter of example 41, wherein the third means is to adjust the pixel depth by lowering the pixel depth of the background layer associated with displaying the frame.

Example 43 includes the subject matter of example 42, wherein the third means is to maintain the pixel depth of a second layer of the frame, the second layer including an alpha component.

Example 44 includes the subject matter of examples 34, 42, or 43, wherein the pixel depth is a number of bits per pixel of a layer in the frame.

Example 45 includes a method comprising receiving a request to display a frame on a display of a computing device at a first resolution, determining whether a fake hot-plug event has been received, when the fake hot-plug event has been received, reducing the first resolution to a second resolution, and when the fake hot-plug event has not been received, maintaining the first resolution.

Example 46 includes the subject matter of example 45, further including transmitting a buffer data request to a memory manager, the buffer data request instructing the memory manager to (A) store the frame at the second resolution in a buffer when the fake hot-plug event has been received and (B) store the frame at the first resolution in the buffer when the fake hot-plug event has not been received.

Example 47 includes the subject matter of example 46, further including receiving a buffer data response from the memory manager, the buffer data response identifying the buffer associated with the frame.

Example 48 includes the subject matter of example 47, further including transmitting buffer data to a display driver to display the frame on the display.

Example 49 includes the subject matter of example 48, wherein the buffer data includes an address of the buffer associated with the frame.

Example 50 includes the subject matter of examples 45, 46, 47, or 48, wherein the fake hot-plug event is triggered when an amount of a battery of the computing device is below a threshold capacity.

Example 51 includes the subject matter of examples 45, 46, 47, or 48, further including setting a flag when the fake hot-plug event is received and resetting the flag based on receiving a signal identifying that a condition associated with the fake hot-plug event is no longer satisfied.

Example 52 is an apparatus comprising a first means to receive a request to display a frame on a display of a computing device at a first resolution. Example 52 further includes a second means to determine whether a fake hot-plug event has been received, when the fake hot-plug event has been received, reduce the first resolution to a second resolution, and when the fake hot-plug event has not been received, maintain the first resolution.

Example 53 includes the subject matter of example 52, further including a third means to transmit a buffer data request to a memory manager, the buffer data request instructing the memory manager to (A) store the frame at the second resolution in a buffer when the fake hot-plug event has been received and (B) store the frame at the first resolution in the buffer when the fake hot-plug event has not been received.

Example 54 includes the subject matter of example 53, wherein the first means is to receive a buffer data response from the memory manager, the buffer data response identifying the buffer associated with the frame.

Example 55 includes the subject matter of example 54, wherein the third means is to transmit buffer data to a display driver to display the frame on the display.

Example 56 includes the subject matter of example 55, wherein the buffer data includes an address of the buffer associated with the frame.

Example 57 includes the subject matter of examples 52, 53, 54, or 55, wherein the fake hot-plug event is triggered when an amount of a battery of the computing device is below a threshold capacity.

Example 58 includes the subject matter of examples 52, 53, 54, or 55, further including a fourth means to set a flag when the fake hot-plug event is received and resetting the flag based on receiving a signal identifying that a condition associated with the fake hot-plug event is no longer satisfied.

Example 59 is a computer readable medium comprising instructions that, when executed, cause a machine to receive a request to display a frame on a display of a computing device at a first resolution, determine whether a fake hot-plug event has been received, when the fake hot-plug event has been received, reduce the first resolution to a second resolution, and when the fake hot-plug event has not been received, maintain the first resolution.

Example 60 includes the subject matter of example 59, wherein the instructions, when executed, cause the machine to transmit a buffer data request to a memory manager, the buffer data request instructing the memory manager to (A) store the frame at the second resolution in a buffer when the fake hot-plug event has been received and (B) store the frame at the first resolution in the buffer when the fake hot-plug event has not been received.

Example 61 includes the subject matter of example 60, wherein the instructions, when executed, cause the machine to receive a buffer data response from the memory manager, the buffer data response identifying the buffer associated with the frame.

Example 62 includes the subject matter of example 61, wherein the instructions, when executed, cause the machine to transmit buffer data to a display driver to display the frame on the display.

Example 63 includes the subject matter of example 62, wherein the buffer data includes an address of the buffer associated with the frame.

Example 64 includes the subject matter of examples 59, 60, 61, or 62, wherein the fake hot-plug event is triggered when an amount of a battery of the computing device is below a threshold capacity.

Example 65 includes the subject matter of examples 59, 60, 61, or 62, wherein the instructions, when executed, cause the machine to set a flag when the fake hot-plug event is received and resetting the flag based on receiving a signal identifying that a condition associated with the fake hot-plug event is no longer satisfied.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

This patent claims priority from Indian Patent Application Serial Number 201641010056, which was filed on Mar. 22, 2016, and is hereby incorporated by reference in its entirety.

What is claimed is:

1. An apparatus comprising:
    a receiver to receive a request to display a frame on a display of a computing device;
    a background layer determiner to determine whether the frame includes a background layer overlapped by a foreground layer having an amount of transparency, the background layer becoming more visible through the foreground layer when the amount of transparency increases, and the background layer becoming less visible through the foreground layer when the amount of transparency decreases; and
    a pixel depth adjuster to, when the frame includes the background layer:
        adjust an initial pixel depth of the background layer overlapped by the foreground layer to a first pixel depth when the amount of transparency of the foreground layer corresponds to a first amount of transparency, where the first pixel depth is less than the initial pixel depth of the background layer;
        adjust the initial pixel depth of the background layer overlapped by the foreground layer to a second pixel depth lower than the first pixel depth when the amount of transparency of the foreground layer corresponds to a second amount of transparency that is less than the first amount of transparency; and
        wherein the term pixel depth denotes a number of bits per pixel.

2. The apparatus of claim 1, wherein the frame is at least one of an image or a video frame.

3. The apparatus of claim 1, wherein the foreground layer includes an alpha component.

4. The apparatus of claim 3, wherein the alpha component is associated with the amount of transparency.

5. The apparatus of claim 4, wherein the background layer determiner is to determine whether the frame includes the background layer overlapped by the foreground layer by identifying the alpha component of the foreground layer.

6. The apparatus of claim 1, wherein the pixel depth adjuster is further configured to adjust a third pixel depth within an area of the background layer that is visible through the foreground layer.

7. A method comprising:
    receiving a request to display a frame on a display of a computing device;

determining whether the frame includes a background layer overlapped by a foreground layer having an amount of transparency, the background layer becoming more visible through the foreground layer when the amount of transparency increases, and the background layer becoming less visible through the foreground layer when the amount of transparency decreases; and when the frame includes the background layer:

adjusting an initial pixel depth of the background layer overlapped by the foreground layer to a first pixel depth when the amount of transparency of the foreground layer corresponds to a first amount of transparency, where the first pixel depth is less than the initial pixel depth of the background layer;

adjusting the initial pixel depth of the background layer overlapped by the foreground layer to a second pixel depth lower than the first pixel depth when the amount of transparency of the foreground layer corresponds to a second amount of transparency lower than the first amount of transparency; and wherein the term pixel depth denotes a number of bits per pixel.

8. The method of claim 7, wherein the frame is at least one of an image or a video frame.

9. The method of claim 7, wherein the foreground layer includes an alpha component.

10. The method of claim 9, wherein the alpha component is associated with the amount of transparency.

11. The method of claim 10, wherein the determining of whether the frame includes the background layer overlapped by the foreground layer includes identifying the alpha component of the foreground layer.

12. The method of claim 7, further including displaying the frame.

13. The method of claim 12, further including maintaining a third pixel depth of the foreground layer of the frame, the foreground layer including an alpha component.

14. A tangible computer readable storage medium comprising instructions that, when executed, cause a machine to:

in response to a request to display a frame on a display of a computing device, determine whether the frame includes a background layer overlapped by a foreground layer having an amount of transparency, the background layer becoming more visible through the foreground layer when the amount of transparency increases, and the background layer becoming less visible through the foreground layer when the amount of transparency decreases; and when the frame includes the background layer:

adjust an initial pixel depth of the background layer overlapped by the foreground layer to a first pixel depth when the amount of transparency of the foreground layer corresponds to a first amount of transparency, where the first pixel depth is less than the initial pixel depth of the background layer; and adjust the initial pixel depth of the background layer overlapped by the foreground layer to a second pixel depth lower than the first pixel depth when the amount of transparency of the foreground layer corresponds to a second amount of transparency lower than the first amount of transparency; and wherein the term pixel depth denotes a number of bits per pixel.

15. The tangible computer readable storage medium of claim 14, wherein the instructions, when executed, cause the machine to determine whether the frame includes the background layer overlapped by the foreground layer by identifying an alpha component of the foreground layer.

* * * * *